Nov. 1, 1938.　　　　H. A. HOKE　　　　2,134,789
BRAKE MECHANISM
Filed Jan. 8, 1937　　　3 Sheets-Sheet 3
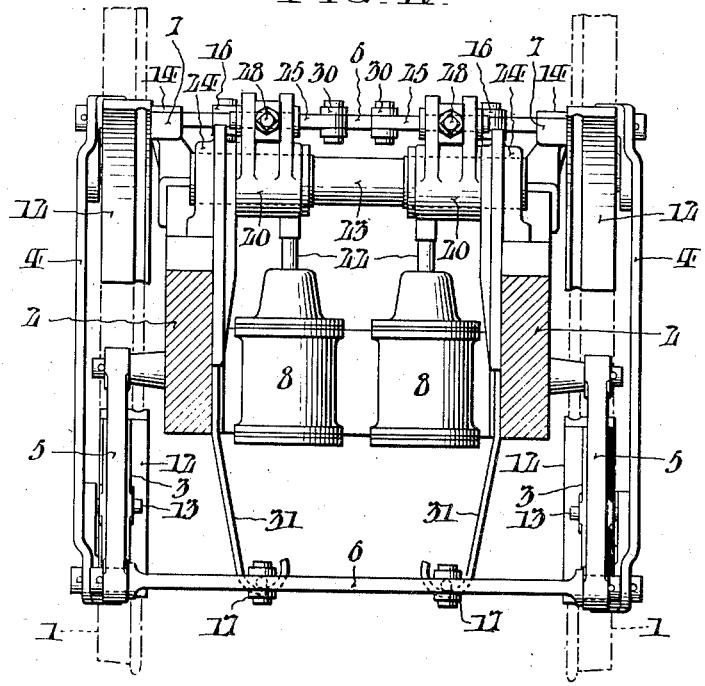
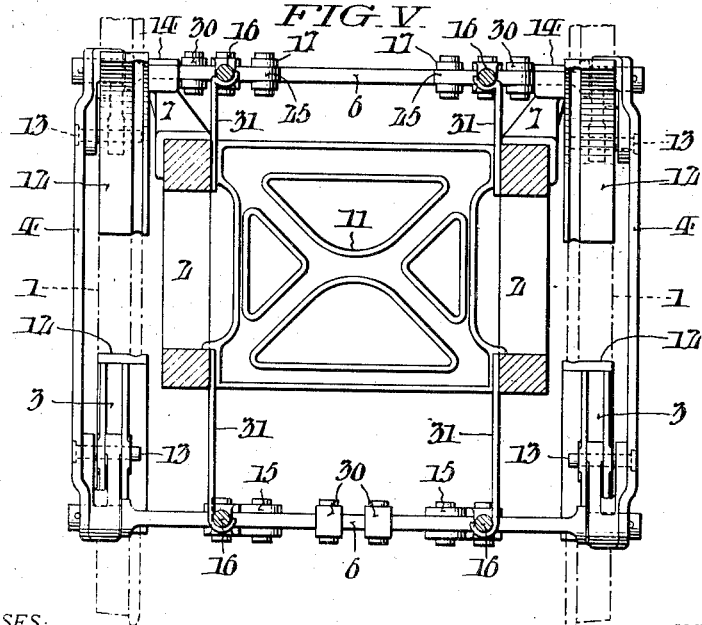
WITNESSES:
Thomas W. Kerr Jr.
William Bell, Jr.
INVENTOR:
Harry A. Hoke,
BY
ATTORNEYS.

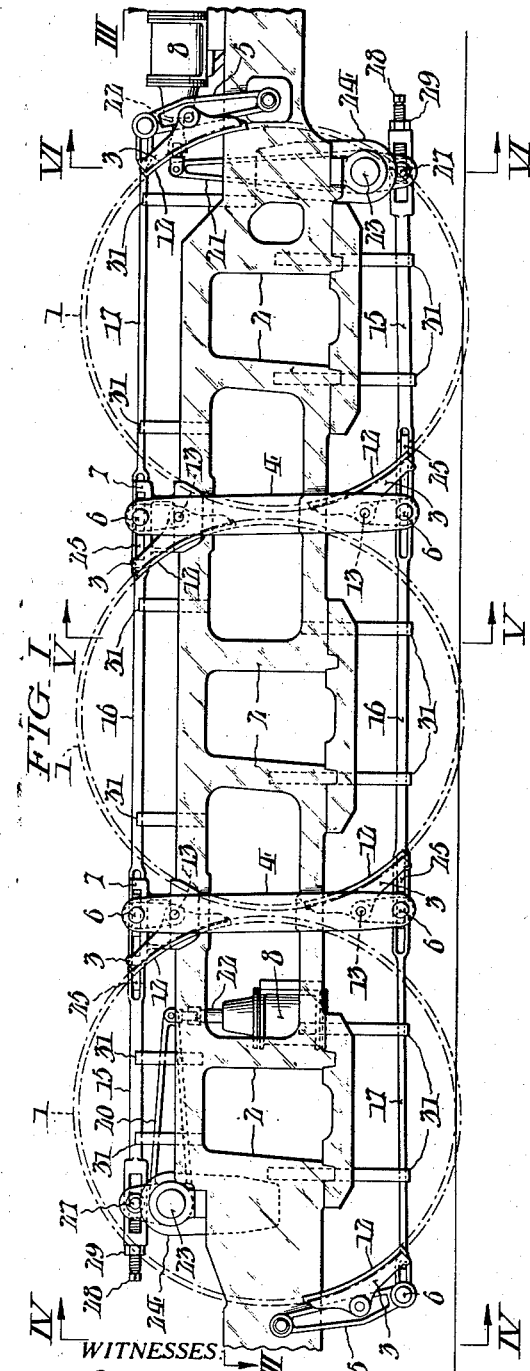
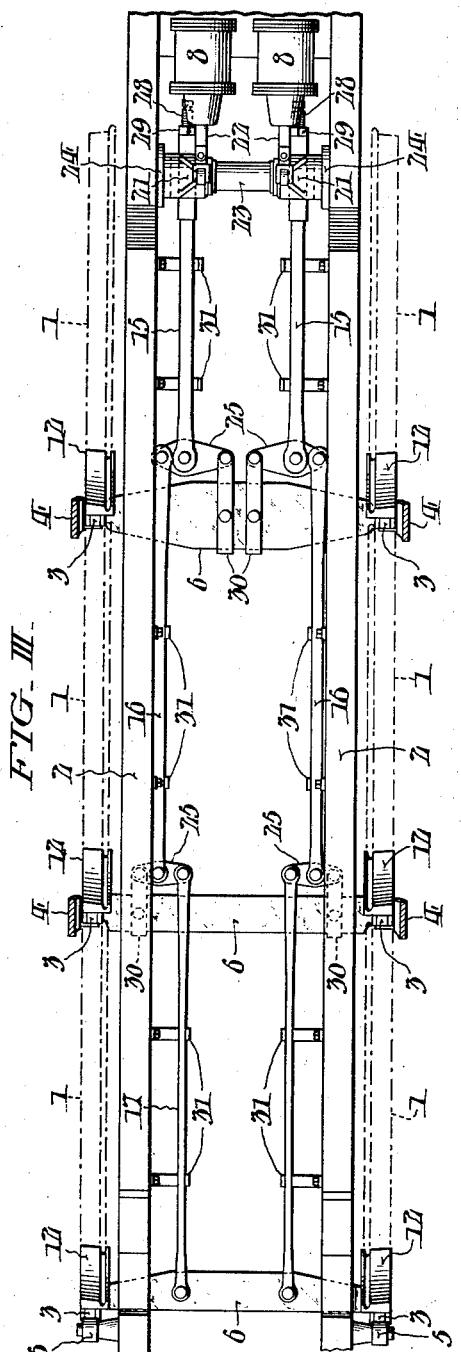

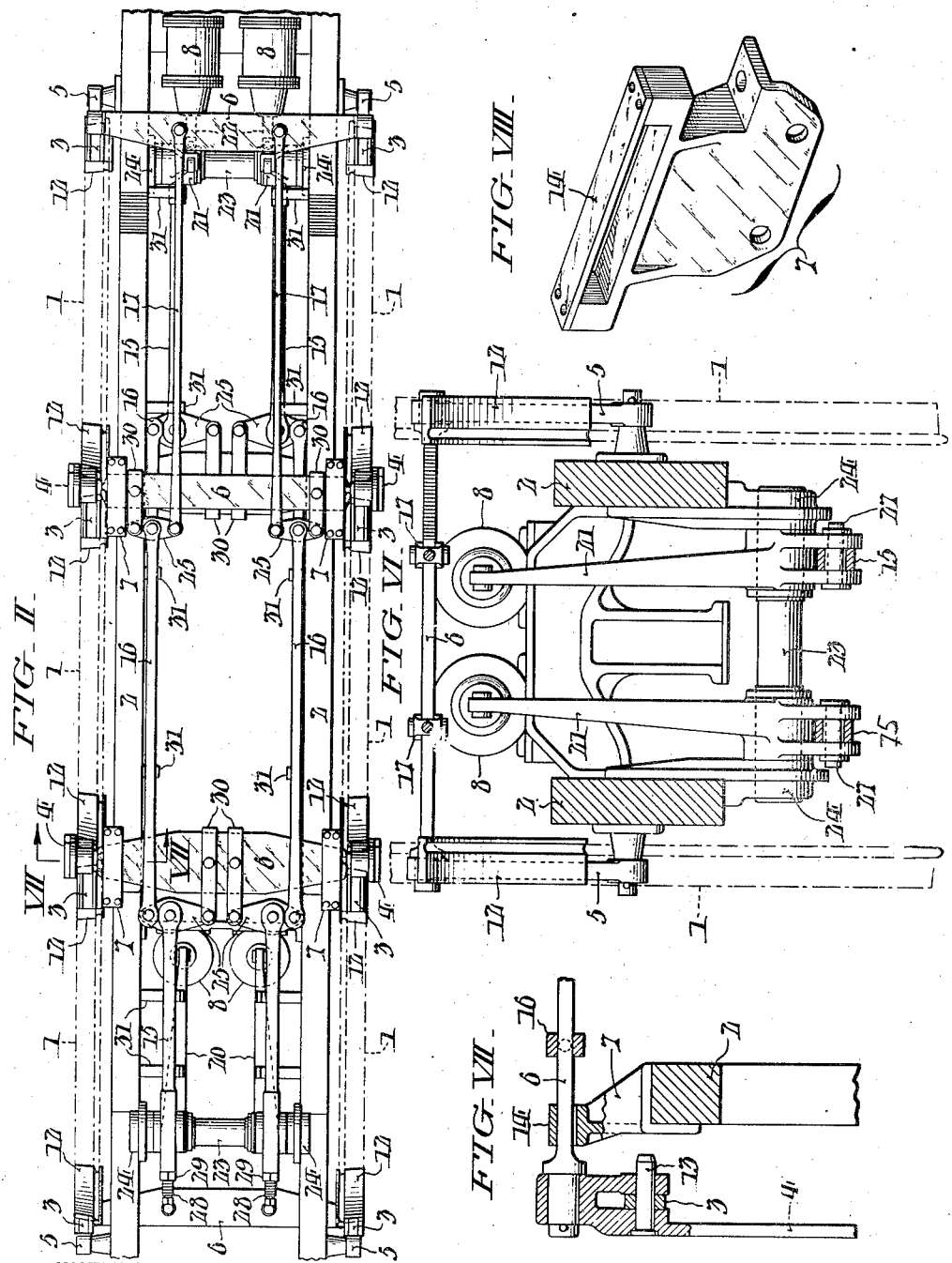

Patented Nov. 1, 1938

2,134,789

UNITED STATES PATENT OFFICE 2,134,789

BRAKE MECHANISM

Harry A. Hoke, Altoona, Pa.

Application January 8, 1937, Serial No. 119,544

11 Claims. (Cl. 188—46)

My invention relates generally to brake mechanism and more particularly to clasp brake mechanism for use on railway vehicles.

Clasp brakes have been in use for some time but certain difficulties attend the use of clasp brakes where adjacent wheels are closely spaced, as on high-speed high-wheel locomotives. The prior art teaches the installation of the brake clogs substantially on one side of the line connecting the wheel centers. This means that each space between adjacent wheels must be large enough to receive two oppositely disposed brake clogs. Also clogs so placed will not result in having the clasping operation take place between diametrically positioned clogs. Further clogs so placed with individual brake hangers cause a heavy reaction pressure from the braking action on the wheel to be transmitted into the vehicle frame.

Therefore the main object of this invention is to provide a clasp brake mechanism which in no way limits the closeness of adjacent wheels of the vehicle in which the clasp brake mechanism is installed. Another object is to provide a clasp brake mechanism of this type in which the brake clogs are positioned to function diametrically on the wheel subject to the clasping action. Another object is to provide a clasp brake mechanism in which all the brake pressure is counter-balanced between cooperating brake clogs, thus avoiding heavy reaction pressures and tendencies to wheel displacement. Another object is to provide a clasp brake mechanism which is equalized to operate as a unitary system with all brake pressure efficiently and harmoniously utilized throughout the system. Still further objects and advantages will become apparent from the following detailed description of a preferred embodiment of my invention, reference being had to the accompanying drawings.

Fig. I shows a side view of my invention as applied to the drivers of a high wheel high-speed locomotive, all nonessential details of the locomotive being omitted for clarity.

Fig. II is a plan view of the same.

Fig. III is a plan section of the same taken generally as indicated by the arrows III—III in Fig. I, showing the connections of the lower brake rigging.

Fig. IV is a view partly in elevation and partly in vertical section and taken as indicated by the arrows IV—IV in Fig. I of the brake rigging.

Fig. V is a vertical section taken as indicated by the arrows V—V in Fig. I.

Fig. VI is a vertical section taken as indicated by the arrows VI—VI in Fig. I.

Fig. VII is a local vertical section taken as indicated by the arrows VII—VII in Fig. II showing the floating brake hanger and equalizer beam in relation to the main frame.

Fig. VIII is a perspective view of one of the guide brackets in which an equalizer beam slides.

For the purpose of a detail description, the preferred embodiment of my invention as shown in the above drawings, may be resolved into the following elements: locomotive driving wheels 1, supporting a frame 2, diametrically positioned brake clogs 3 clasping each driving wheel 1, floating brake hangers 4, end brake hangers 5, equalizer beams 6 connecting the corresponding ends of corresponding hangers 4 and 5, brackets 7 rigidly attached to the frame 2 for supporting certain of the equalizer beams 6, and an upper and lower brake rigging including operating cylinders 8 attached to the equalizer beams 6.

The driving wheels 1 are closely spaced and the clogs 3 are positioned in the spaces between the wheels 1 above and below the line of wheel centers and also beyond each end wheel 1 to complete the clasp system. Thus there is but one clog 3 in each upper and lower space between the wheels 1 and the brake system in no way limits the closeness of the spacing of the wheels 1. The wheels 1 can be spaced so close with my invention that the rims almost touch. The frame 2 and the driving wheels 1 are of a conventional type and need not occupy us further. A frame cross-plate 11 is shown in Fig. V.

The brake clogs 3 carry the usual brake shoes 12 and are structurally similar to what is well-known in the art. It is unnecessary to further consider the structure of these clogs 3 and shoes 12 for the novelty in this invention is more concerned with the arrangement of the clogs 3 to clasp the wheels 1 from diametrically opposite positions without requiring any more space between adjacent wheels 1 than must necessarily result even from the smallest possible clearance between the wheels 1. This invention utilizes both the spaces above and below the line of wheel centers instead of a space on or near the line of wheel centers or only the space above or below the line of wheel centers.

The oppositely disposed clogs 3 in the upper and lower spaces between wheels 1 are carried by the floating hangers 4, the clogs 3 in corresponding upper and lower spaces being carried by the same floating hanger 4. It is of great importance to note that the clogs 3 at the upper and lower ends of the floating hangers 4 are oppositely disposed and work on different wheels, each clog 3 absorbing and utilizing the reaction pressure of the other as a braking pressure. On the outside of each end wheel 1, a clog 3 is carried by an end brake hanger 5. All of the clogs 3 are pivotally attached to their respective hangers in the usual fashion; Fig. VII shows in detail how this pivotal attachment is secured by means of a pin 13.

The floating brake hangers 4 are pivotally supported from their upper ends by means of the equalizer beams 6 connecting their upper ends, these particular equalizer beams being in turn supported in sliding engagement by brackets 7 rigidly attached to the frame 2. The equalizer beams 6 at the lower ends of the floating hangers 4 are free and derive their support through the floating hangers 4. One of these brackets 7 is shown in perspective in Fig. VIII, with its removable cover plate 14 clearly appearing. The elongated opening under the cover plate 14 receives an end portion of one of the equalizer beams 6 supporting the floating hangers 4, and permits a limited sliding movement of the equalizer beams 6 therein. It will be noted that the equalizer beams 6 have slight structural differences, being of different widths and this is governed by the place of attachment of the brake rigging to the equalizer beam 6. Those equalizer beams 6 attached to the brake rigging at the central portion are given an increased width at that portion to take care of the additional strain. Those equalizer beams 6 attached to the brake rigging at the ends of the equalizer beams 6 are of uniform width and narrower than those just mentioned above. Functionally, these equalizer beams 6 are all the same. The end brake hangers 5 are pivotally attached to the frame 2 beyond each end wheel 1, and are also pivotally attached to the equalizer beams 6.

Thus far I have described the arrangement of the brake clogs 3 to clasp the wheels 1 from diametrically opposite positions and the use of the floating brake hangers 4 to accomplish this end without limiting the clearances between the wheels 1. I now turn to the brake rigging by which pressure is applied to the clogs 3 on the wheels 1 through the equalizer beams 6. The brake rigging consists of a duplicate system of operating links 15, 16 and 17 which urges the upper equalizer beams 6 in one direction and the lower equalizer beams 6 in the opposite direction, by means of pressure from the operating cylinders 8. It will be seen in the drawings that the brake rigging is composed of a distinct upper and lower brake rigging which are almost identical except for a slightly different positioning of the operating cylinders 8 on the frame 2 and the different form of operating levers 20 and 21, due to this different positioning of the cylinders 8.

The operating cylinders 8 are four in number, two for the upper brake rigging and two for the lower brake rigging; and all are securely attached to the frame 2. The two operating cylinders 8 for the upper brake rigging are at one end of the installation and the operating cylinders 8 for the lower brake rigging are at the other end.

The pistons 22 of the operating cylinders 8 are pivotally connected to operating levers 20 and 21 which are rigidly attached to rods 23 journalling into bearings 24 mounted on the frame 2. Because it was more convenient in this particular case to mount two of the operating cylinders 8 horizontally at one end of the installation and the other two vertically at the other end, the corresponding operating levers 20 and 21 are shaped accordingly. Lever 20 is in effect a lever with arms at 90° to each other; lever 21 is in effect a lever with the arms extending in the same straight line. Functionally, levers 20 and 21 are the same. There is no occasion, however, to dwell on these minor distinctions between the upper and lower brake rigging, and further reference need not be made to them in this description.

The four operating levers 20 and 21 are pivotally connected to the four operating links 15 by means of pins 27 which ride in slots in the ends of the operating links 15. Set screws 28 having lock nuts 29 abut against the pins 27 and provide an adjustment means for taking up brake wear and for the general adjustment of the system. The other ends of operating links 15 are bifurcated for pivotal attachment to the central portions of equalizer levers 25 which are in turn pivotally attached at one end to the equalizer beams 6 by means of straps 30. The other end of the equalizer lever 25 is in each case pivotally attached to the end of operating link 16 which is bifurcated for that purpose. It is to be noted that the bifurcation in this case is extended to allow the equalizer beam 6 to fit between the two legs of the bifurcation. In a similar manner, operating links 16 and 17 are pivotally attached to the next equalizer beams 6 through equalizer levers 25. The other ends of equalizer links 17 are pivotally attached directly to those equalizer beams 6 which are associated with the end brake hangers 5. Thus, all upper equalizer beams 6 are connected to the same two operating cylinders 8 and to each other as a system; and all lower equalizer beams 6 are connected to the other two operating cylinders 8 in the same manner. These upper and lower systems are unified in one system by the floating brake hangers 4. These operating links 15, 16 and 17 are comparatively light, as are the other parts of this invention, and additional supports 31 are provided. These additional supports 31 are safety supports intended to support the brake rods when the brake is released, or in case the brake rod is disconnected; therefore, clearance is generally allowed between the brake rods and the safety supports. These supports 31 are attached to the frame 2, there being two supports 31 for each operating link 15, 16 and 17. It is to be noted in this connection that it is due to the harmonious equalization and counter-balancing of brake pressures that such comparatively light parts are possible.

The operation of this invention is obvious from the above description and it is unnecessary to enlarge on what has already been said in connection with the above detailed description. When the brakes are applied by pressure from the cylinders 8, each wheel 1 is clasped between pairs of clogs 3 without any tendency to wheel displacement. The pressure from the two cylinders 8 at one end is balanced by the pressure from the two cylinders 8 at the other end of the frame 2, through the floating hangers 4. While there is a small reaction pressure on the frame 2 through the end hangers 5, this is negligible when the harmonious distribution of force throughout the system as a whole is considered.

My invention thus provides a comparatively light clasp brake system, which effectively applies braking pressures without undue pressure concentration at any one point. It also provides diametrically disposed clasp brakes which do not in any way limit the clearances between driving wheels. It provides a system which avoids heavy reaction pressures by scientific counter-balancing of pressures throughout the system.

While I have described the preferred embodiment of my invention in some detail, it will be obvious to one skilled in this art that various modifications and changes can be made without departing from the spirit of my invention as hereinafter claimed.

Having thus described my invention, I claim:

1. In a system of clasp brakes, a vehicle frame supported by wheel and axle assemblies, upper and lower brake rigging associated with said wheels for braking cooperation therewith, said upper brake rigging being attached to said frame, floating hangers pivotally connected to and supported by said upper brake rigging, and lower brake rigging pivotally connected to and supported by said floating hangers, each of said hangers having mounted thereon a pair of oppositely disposed brake clogs.

2. The invention of claim 1 characterized further by the fact that said brake rigging has equalizer beams and said floating hangers are pivotally attached to the equalizer beams of said brake rigging.

3. The invention of claim 1 characterized further by the fact that said brake clogs are arranged in pairs to clasp each of said wheels between diametrically opposite clogs.

4. In a system of brakes, a vehicle frame supported by wheels, and upper and lower brake rigging associated with said wheels for braking cooperation therewith, including a floating hanger having a pair of oppositely disposed brake clogs pivotally attached thereto, each clog being in braking cooperation with a different wheel, said upper brake rigging being mounted on said frame and supporting said lower brake rigging through said hangers.

5. In a system of brakes, a vehicle frame supported by wheels, a floating hanger including an operating mechanism attached to its upper end and pivotally supporting said hanger from said frame, operating mechanism attached to the lower end of said hanger, and oppositely disposed brake clogs attached at each end of said floating hanger, each of said clogs being in braking cooperation with different but adjacent wheels.

6. In a system of clasp brakes, a vehicle frame supported by closely spaced wheels, brake clogs in braking cooperation with said wheels, each wheel being clasped between a pair of oppositely disposed and diametrically positioned clogs, said clogs being positioned above or below the line of wheel centers, floating hangers pivotally attached to the oppositely disposed clogs of adjacent wheels, upper and lower equalizer beams pivotally attached to the upper and lower portions of said floating hangers, said upper equalizer beams being attached to and supported by said frame, operating links attached to said equalizer beams, and an operating means connected to said operating links.

7. The invention of claim 6 characterized further by the fact that there is a means for adjusting said operating links to provide for brake wear, and coordination of the system.

8. In a brake mechanism for vehicles having at least two longitudinally aligned wheels at one side of the vehicle and arranged closely together, two brake shoes located between said wheels and arranged one above and one below the closest portions of the treads of said wheels and being movable in opposite directions into braking engagement with the treads of the wheels, a lever for actuating said shoes, a support for said lever pivotally attached to the upper end of said lever, power applying means connected to said support, and power applying means connected to the lower end of the lever, both of said power applying means being simultaneously operative to actuate said lever.

9. In a system of clasp brakes, a vehicle frame supported by closely spaced wheels, brake clogs in braking cooperation with said wheels, each wheel being clasped between a pair of oppositely disposed and diametrically positioned clogs, said clogs being positioned above or below the line of wheel centers, floating hangers pivotally attached to the oppositely disposed clogs of adjacent wheels, upper and lower equalizer beams pivotally attached to the upper and lower portions of said floating hangers respectively, operating links connecting said upper equalizer beams and forming an operating system, operating links connecting said lower equalizer beams and forming a second operating system, and operating means connected to said operating systems.

10. In a system of clasp brakes, a vehicle frame supported by closely spaced wheels, brake clogs in braking cooperation with said wheels, each wheel being clasped between a pair of oppositely disposed and diametrically positioned clogs, said clogs being positioned above or below the line of wheel centers, floating hangers pivotally attached to the oppositely disposed clogs of adjacent wheels, equalizer beams pivotally attached to the upper and lower portions of said floating hangers, equalizer links attached to said equalizer beams, operating links attached to said equalizer links, and an operating means connected to said operating links.

11. The invention of claim 6 characterized further by the fact said upper equalizer beams are attached to said frame with capacity for limited movement in their operation.

HARRY A. HOKE.